United States Patent [19]

Lee et al.

[11] Patent Number: 5,459,215
[45] Date of Patent: Oct. 17, 1995

[54] PROCESS FOR PRODUCING A HEAT-RESISTANT COPOLYMER

[75] Inventors: Chan H. Lee; Kun H. You, both of Daejon, Rep. of Korea

[73] Assignee: Lucky Ltd., Seoul, Rep. of Korea

[21] Appl. No.: 367,721

[22] Filed: Jan. 3, 1996

[51] Int. Cl.$^6$ .................................................. C08F 218/02
[52] U.S. Cl. ...................................... 526/307.7; 526/201
[58] Field of Search ............................................ 526/307.7

[56] References Cited

U.S. PATENT DOCUMENTS

| | | |
|---|---|---|
| 3,010,936 | 11/1961 | Irvin . |
| 3,463,833 | 8/1969 | Isogawa . |
| 3,551,525 | 12/1970 | Wilhelm et al. . |
| 3,632,684 | 1/1972 | Tellier et al. . |
| 4,526,928 | 7/1985 | Mathumoto et al. . |
| 4,529,753 | 7/1985 | Taylor . |
| 4,613,650 | 9/1986 | Sekiya et al. . |
| 4,659,790 | 4/1987 | Shimozato et al. . |
| 4,996,134 | 2/1991 | Enyo et al. . |
| 5,200,441 | 4/1993 | Kim et al. . |
| 5,204,406 | 4/1993 | Fujii et al. . |

OTHER PUBLICATIONS

CA 113:116508 Räiner et al corresponding DE 3834549 Apr. 1990.

Primary Examiner—Joseph L. Schofer
Assistant Examiner—N. Sarafim
Attorney, Agent, or Firm—Curtis, Morris & Safford

[57] ABSTRACT

A process for producing a heat-resistant copolymer which comprises the emulsion polymerization of 50 to 75 parts by weight of α-methylstyrene, 5 parts by weight or less of styrene, 10 to 30 parts by weight of vinyl cyanide compound, 0.1 to 10 parts by weight of ethylenically unsaturated amide, and 10 parts by weight or less of acrylic alkyl ester or methacrylic alkyl ester, in the presense of 1.0 to 30 parts of a seed latex which comprises 50 to 80 parts by weight of α-methylstyrene, 5 parts by weight or less of styrene, 15 to 30 parts by weight of vinyl cyanide compound, 10 parts by weight or less of ethylenically unsaturated amide and 10 parts by weight or less of acrylic alkyl ester or methacrylic ester.

4 Claims, No Drawings

PROCESS FOR PRODUCING A HEAT-RESISTANT COPOLYMER

FIELD OF THE INVENTION

This invention relates to the process for producing a heat-resistant copolymer showing excellent heat resistance, good processability, higher impact resistance and good latex stability, and being high in the solid content.

Recently, the heat-resistant ABS resin (acrylonitrile butadiene-styrene resin) has been widely used as the parts of the electric and electronic appliances, such as office appliances, home appliances, of automobiles, ets.

For the preparation of this resin, the research for the process for producing a heat-resistant copolymer used for compounding with ABS resin has been conducted extensively.

BACKGROUND ART

For example, Japanese Patent Laying open Publication (Sho) Nos. 58-0206657, 59-135210 and 59-184243 disclose the process for producing a heat-resistant copolymer including N-phenylmaleimide. However, this process may improve the heat resistance of the resin, but the physical properties such as processability and impact resistance are deteriorated.

Further, U.S. Pat. Nos. 3010936 and 4659790 disclose the process for producing a heat-resistant copolymer including α-methylstyrene.
However, these processes a I so have the drawbacks that convetsion, latex stability, moldability, and heat stability at high temperature are not good.

The heat-resistant copolymers produced by both the above processes have a poor latex stability and a low solid content.

SUMMARY OF THE INVENTION

To improve the above problems, the inventors conducted the emulsion polymerization of α-methylstyrene, styrene, and vinyl cyanide compounds with monomers, such as ethylenically unsaturated amide, acrylic alkyl ester and methacrylic alkyl ester to obtain the polymer having a polymerizaton conversion of about 96% or more. By using the resultant polymer as a seed latex and the above monomers, the emulsion polymerization was carried out.

The obtained polymer is the heat-resistant copolymer having a polymerization conversion of about 97% or more, a solid content of about 45% or more and a glass transition temperature of about 135° C. or more.

DETAILED DESCRIPTION OF THE INVENTION

Hereinafter, the present invention will be explained in further detail.

1) Preparation of a seed latex

The process for producing the seed latex is the emulsion polymerization, and as the method of addition of each monomer component, it is used that the batch operation, wherein the total amounts of the components are added to the reactor all at once, and the continuous operation wherein the total amounts or the parts of components are added to the reactor continuously. in this invention, the combination of the batch operation and the continuous operation may be used.

When the seed latex is produced, 75~90% by weight of monomers based on the total weight of monomers used are introduced in a batch type, and reacted at the temperature range of 55~75% for 1~2 hours, and then 8~22% by weight of total amounts of monomers are introduced continuously in the temperature range of 65~80% for 2~5 hours. Afterwards, the remaining monomers and initiator are introduced, and reacted for 1~2 hours to obtain the seed latex.

Examples of the monomers for use in the production of the seed latex are at least two selected from α-methylstyrene, styrene, vinyl cyanide compound, ethylenically unsaturated amide, acrylic alkyl ester or methacrylic alkyl ester. Particularly, the seed latex is polymerized by using the monomers of 50~80 parts by weight of α-methylstyrene, 5 parts by weight or less of styrene, 15~30 parts by weight of vinyl cyanide compound, 10 parts by weight or less of ethylenically unsaturated amide, and 10 parts by weight or less of acrylic alkyl or methacrylic ester. As a methacrylic alkyl ester, methyl methacrylate (including all kinds of the same, similar or substitutable compounds thereof) may be used, and as an ethylenically unsaturated amide, methacrylic amide (including all kinds of the same, similar or substitutable compounds thereof) may be used.

Examples of the emulsifier include sodium and potassium salts of rosin acid and higher fatty acids, sodium and potassium salts of alkylbenzene sulfonic acid, etc., which may be used alone or in admixture of two or more.

Examples of the polymerization catalyst include a redox catalyst comprising of a combination of peroxides, such as persulfate, diisopropylbenzene hydroperoxide, cumene hydroperoxide, etc., with a reducing agent, such as sodium formaldehyde sulfoxylate, sodium ethylene diamine tetraacetate, ferrous sulfate, dextrose, sodium pyrophosphate, sodium hydrosulfite, etc. When a redox catalyst is used, the amount of the oxidizing agent is 0.2~0.4 parts by weight based on 100 parts by weight of the total monomers.

As a molecular weight modifier, tertiary dodecylmercaptan may be used, and the amount thereof is 0.6 parts by weight or less based on 100 parts by weight of the total monomers.

The polymerization conversion of the seed latex obtained by the above process is about 96% or more.

2) Preparation of a heat-resistant copolymer

The emulsion polymerization is carried out by using 1~30 parts by weight of the seed latex obtained above, 50~75 parts by weight of α- methylstyrene, 5 parts by weight or less of styrene, 10~30 parts by weight of vinyl cyanide compound, 0.1~10 parts by weight of a ethylenically unsaturated amide, 10 parts by weight or less of a acrylic alkyl ester or a methacrylic alkyl ester, 0.2~0.6 parts by weight of a molecular weight modifier, 0.2~0.4 parts by weight of an oxidizing agent lo in a redox initiator, and 1~4 parts by weight of an emulsifier to obtain the heat-resistant copolymer having a polymerization conversion of about 97% or more and a solid content of about 45% or more.

Hereafter, the present invention will be explained in further detail.

At first, the seed latex is introduced to the reactor in a batch. 50~99% by weight of the monomer based on the total weight of the monomer used in the preparation of the heat-resistant copolymer are introduced in the combination of the batch operation and the continuous operation in the temperature range of 50°~85° C. for 2~5 hours, and then the emulsion polymerization is carried out by introducing 1~20% by weight of the monomer based on the total weight of monomers in a batch in the temperature range of 70°~85° C. for 1~2 hours to obtain the heat-resistant copolymer.

Among the monomers used in this invention, methyl methacrylate may be used as a methacrylic alkyl ester, and methacrylic amide may be used as an ethylenically unsaturated amide.

Examples of an emulsifier include sodium and potassium salts of rosin acid and higher fatty acids, sodium and potassium salts of alkylbenzene sulfonic acid, etc., which may be used alone or in admixture of two or more. As the polymerization catalyst, the redox catalyst comprising a combination of peroxides, such as persulfate, diisopropylbenzene hydroperoxide, cumene hydroperoxide, etc., with a reducing agent. such as sodium formaldehyde sulfoxylate, sodium ethylenediamine tetraacetate, ferrous sulfate, dextrose,sodium pyrophosphate, sodium hydrosulfite, etc. may be used. As a molecular weight modifier, tertiary dodecylmercaptan may be used, and the amount thereof is 0.6 parts by weight or less based on 100 parts by weight of the total monomers.

After the completion of the reaction, the polymerization conversion is about 97% or more. The solid content is about 45% or more, and the obtained latex is solidified with the aqueous solution of calcium chloride, dehydrated, and dried.

The solid content and the weight of the coagulum are calculated by means of the following equations:

$$\text{the solid content (\%)} = \frac{\text{the weight of the solid}}{\text{the weight of the latex}} \times 100$$

the weight of the coagulum (%) =

$$\frac{\text{the weight of the coagulum in the reactor}}{\text{the weight of the total monomers introduced}} \times 100$$

When the weight of the coagulum is about 0.5% or more, the latex is remarkably unstable, which is not suitable for this invention.

EXAMPLES (1) Preparation of the seed latex

[A1]

Into the reactor. the components in the first step of composition A1 indicated in Table 1, that is, 110 parts by weight of ion exchanged water. 2.0 parts by weight of sodium dodecylbenzenesulfonate as an emulsifier, 65 parts by weight of α-methylstyrene, 2 parts by weight of styrene. 14 parts by weight of acrylonitrile. 0.4 parts by weight of tertiary dodecylmercaptan (TDDM) as a molecular weight modifier, and a redox catalyst comprising 0.2 parts by weight of potassium persulfate as an initiator and 0.10 parts by weight of sodium hydrosulfite are introduced in a batch at the temperature of 45° C., and then reacted for 1 hour 30 minutes while raising the reaction temperature to 70° C.

Thereafter, the components in the second step of composition A1. that is the emulsified mixture comprising 70 parts by weight of ion exchanged water, 0.6 parts by weight of an emulsifier. 11 parts by weight of acrylonitrile, 4 parts by weight of methacrylic amide, 3 parts by weight of methyl methacrylate and 0.2 parts by weight of TDDM, and 0.1 parts by weight of persulfate as an initiator are mixed and introduced to the reactor continuously at the temperature of 75% for 3 hours.

After raising the polymerization temperature to 80° C., the components in the third step of composition A1, that is, the emulsified mixture comprising 5 parts by weight of ion exchanged water, 0.1 parts by weight of an emulsifier and 1 parts by weight of acrylonitrile, and 0.05 parts by weight of persulfate as an initiator are mixed, introduced to the reactor in a batch, then reacted for 30 minutes and aged for 1 hour.

After the completion of the reaction, the weight of the solid content(%) in the obtained latex is measured and the polymerization conversion is calculated. In order to determine the latex stability, the weight of the coagulum(α) is measured.

[A2 to A4]

The procedures are carried out in the same as described in the above A1 except that composition A2~A4 are used instead of composition A1 indicated in Table 1.

The results are shown i n Table 1.

(2) Preparation of a heat-resistant copolymer

[B1]

Into the reactor, the components in the first step of composition B1 indicated in Table 2, that is, 75 parts by weight of ion exchanged water. 1.0 parts by weight of sodium dodecylbenzenesulfonate as an emulsifier. 5 parts by weight of the seed latex [A2] and 68 parts by weight of α-methylstyrene are introduced in a batch. After raising the reaction temperature to 77° C., a redox catalyst comprising 0.2 parts by weight of sodium persulfate as an initiator and 0.1 parts by weight of sodium hydrosulfite are introduced.

Then, the components in the second step of the composition B1. that is, the emulsified mixture comprising 40 parts by weight of ion exchanged water. 1.7 parts by weight of an emulsifier, 22 parts by weight of acrylonitrile, 3 parts by weight of methacrylic amide, 1 parts by weight of methyl methacrylate and 0.55 parts by weight of TDDM, and 0.1 parts by weight of persulfate as an initiator are mixed and introduced continuously at the temperature of 78 ° C. for 4 hours.

After raising the polymerization temperature to 80° C., the components in the third step of composition B1, that is, the emulsified mixture comprising 5 parts by weight of ion exchanged water, 0.1 parts by weight of an emulsifier and 1 parts by weight of styrene, and 0.05 parts by weight of persulfate as an initiator are mixed and introduced in a batch, then reacted for 30 minutes and aged for 1 hour.

After the completion of the reaction, the weight of the solid content(%) in the obtained latex is measured and the polymerization conversion is calculated. In order to determine the latex stability, the weight of the coagulum(%) is measured.

Then, the obtained latex is solidified with the aqueous solution of calcium chloride at the temperature of 120° C., washed and dried, and thereafter, the glass transition temperature is measured by using DSC (differential scanning calorimeter). The results are shown in Table 2.

[B2–B8]

The procedures are carried out in the same as described in the above B1 except that compositions B2~B8 are used instead of composition B1 indicated in Table 2.

The results are shown in Table 2.

APPLICATION EXAMPLE

[C1]

The powders prepared in the above Example B1 and the grafted ABS polymer (DP 210, manufactured by Lucky Corporation, in Korea) are mixed and 0.4 parts by weight of a lubricant, 0.4 parts by weight of an antioxidant and 0.2 parts by weight of a ultraviolet stabilizer based on 100 parts by weight of the mixed powder are introduced thereto, and extruded with the twin-screw extruder at the cylinder temperature range of 230°~260° C. to obtain the pellet forms.

By using the above pellets, the specimen is prepared and the physical properties thereof are measured.

The results are shown in Table 3.

[C2 to C6]

The procedures are carried out in the same as described in the above C1 except that compositions C2~C6 are used instead of composition C1 indicated in Table 3.

The results are shown in Table 3.

TABLE 1

| the batch introduction | A1 | A2 | A3 | A4 |
|---|---|---|---|---|
| 1-1 ion exchanged water | 110 | 110 | 110 | 205 |
| 1-2 emulsifier | 2.0 | 2.3 | 3.6 | 1.8 |
| 1-3 α-methylstyrene | 65 | 70 | 75 | 71 |
| 1-4 styrene | 2 | 1 | . | . |
| 1-5 acrylonitrile | 14 | 13 | 9 | 15 |
| 1-6 methyl methacrylate | . | . | 2 | . |
| 1-7 TDDM | 0.4 | 0.4 | 0.4 | 0.4 |
| the continuous introduction | | | | |
| 2-1 ion exchanged water | 70 | 70 | 70 | 26 |
| 2-2 emulsifier | 0.6 | 0.5 | 0.4 | 0.8 |
| 2-3 acrylonitrile | 11 | 12 | 10.5 | 12 |
| 2-4 methyl methacrylate | 3 | 1 | 2 | . |
| 2-5 methacrylic amide | 4 | 2 | 0.5 | . |
| 2-6 TDDM | 0.2 | 0.2 | 0.2 | 0.1 |
| the batch introduction | | | | |
| 3-1 ion exchanged water | 5 | 5 | 5 | 20 |
| 3-2 emulsifier | 0.1 | 0.1 | 0.1 | 0.1 |
| 3-3 styrene | . | 1 | . | . |
| 3-4 acrylonitrile | 1 | . | 1 | 2 |
| polymerization conversion(%) | 99 | 98 | 96 | 97 |
| coagulum(%) | 0.05 | 0.1 | 0.15 | 0.2 |

TABLE 2

| the batch introduction | B1 | B2 | B3 | B4 | B5 | B6 | B7 | B8 |
|---|---|---|---|---|---|---|---|---|
| 1-1 ion exchanged water | 75 | 115 | 115 | 115 | 75 | 115 | 75 | 115 |
| 1-2 emulsifier | 1.0 | 2.6 | 2.5 | 2.6 | 0.8 | 2.6 | 1.0 | 2.6 |
| 1-3 seed latex | 5[A2] | 10[A2] | 20[A2] | 10[A3] | 20[A3] | 10[A1] | 30[A1] | 10[A4] |
| 1-4 α-methylstyrene | 68 | . | . | . | . | . | . | . |
| the continuous introduction | | | | | | | | |
| 2-1 ion exchanged water | 40 | . | . | . | 40 | . | 40 | . |
| 2-2 emulsifier | 1.7 | . | . | . | 1.6 | . | 1.4 | . |
| 2-3 α-methylstyrene | . | 65 | 60 | 64 | . | 67 | . | 65 |
| 2-4 acrylonitrile | 22 | 19 | 17 | 23 | 16 | 19 | 12 | 21 |
| 2-5 methyl methacrylate | 1 | 4 | . | 1 | . | 2 | 2 | 1 |
| 2-6 methacrylic amide | 3 | 1 | 2 | 1 | 5 | 1 | . | 2 |
| 2-7 TDDM | 0.55 | 0.55 | 0.55 | 0.55 | 0.55 | 0.55 | 0.55 | 0.55 |
| the batch introduction | | | | | | | | |
| 3-1 ion exchanged water | 5 | 5 | 5 | 5 | 5 | 5 | 5 | 5 |
| 3-2 emulsifier | 0.1 | 0.1 | 0.1 | 0.1 | 0.1 | 0.1 | 0.1 | 0.1 |
| 3-3 styrene | 1 | . | . | 1 | . | 1 | . | . |
| 3-4 acrylonitrile | . | 1 | . | . | . | . | 1 | 1 |
| 3-5 methyl methacrylate | . | . | 1 | . | 1 | . | 1 | . |
| polymerization conversion(%) | 98 | 98 | 97 | 98 | 98 | 97 | 98 | 98 |
| coagulum(%) | 0.05 | 0.2 | 0.1 | 0.1 | 0.1 | 0.1 | 0.1 | 0.15 |
| glass transition temperature(°C.) | 135 | 135 | 138 | 135 | 142 | 140 | 139 | 135 |

TABLE 3

| | C1 | C2 | C3 | C4 | C5 | C6 |
|---|---|---|---|---|---|---|
| heat-resistant copolymer | B2 | B3 | B4 | B5 | B6 | B7 |
| | 60 | 60 | 60 | 60 | 60 | 60 |
| grafted ABS polymer (DP210) | 40 | 40 | 40 | 40 | 40 | 40 |
| notched Izod impact strength (kg · cm/cm) (ASTM D256) | 17.0 | 16.0 | 22.0 | 14.0 | 16.0 | 14.0 |
| heat deflection temperature(°C.) (ASTM D648) | 109 | 111 | 108 | 113 | 111 | 111 |
| melt flow index (g/10 min, 10 kg, 220° C.) (ASTM D1238) | 7 | 6 | 6 | 4 | 5 | 6 |

We claim:

1. A process for producing a heat-resistant copolymer which comprises the emulsion polymerization of 50 to 75 parts by weight of α-methylstyrene, 5 parts by weight or less of styrene, 10 to 30 parts by weight of vinyl cyanide compound, 0.1 to 10 parts by weight of ethylenically unsaturated amide, and 10 parts by weight or less of acrylic alkyl ester or methacrylic alkyl ester, in the presence of 1.0 to 30 parts of a seed latex which comprises 50 to 80 parts by weight of α-methylstyrene, 5 parts by weight or less of styrene, 15 to 30 parts-by weight of vinyl cyanide compound, 10 parts by weight or less of ethylenically unsaturated amide and 10 parts by weight or less of acrylic alkyl ester or methacrylic ester.

2. The process of claim 1 wherein said ethylenically unsaturated amide is methacrylic amide.

3. The process of claim 1 wherein methacrylic alkly ester is methylmethacrylate.

4. The process of claim 1 wherein after introduction of the seed latex in a batch, the emulsion polymerization of 50 to 99% by weight of monomers based on the total weight of monomers used in the production of a heat-resistant copolymer by the combination of the batch operation and the continuous operation is carried out in the temperature range of from 50° to 85° C. for 2 to 5 hours, and then the emulsion polymerization of 1 to 20% by weight of monomers based on the total weight of monomers is carried out in the temperature range of from 70° to 85° C. for 0.5 to 2 hours by the batch operation.

* * * * *